United States Patent
Akishev et al.

(10) Patent No.: US 7,429,171 B2
(45) Date of Patent: Sep. 30, 2008

(54) DEVICE FOR SHEET MATERIAL CORRUGATION

(75) Inventors: Niaz Irekovich Akishev, Kazan (RU); Ildus Muhametgaleevich Zakirov, Kazan (RU); Alexandr Vladimirovich Nikitin, Kazan (RU)

(73) Assignees: Airbus, Blagnac Cedex (FR); Otkrytoe Aktsionernoe Obschestvo, Kazan (RU)

( * ) Notice: Subject to any disclaimer, the term of this patent is extended or adjusted under 35 U.S.C. 154(b) by 138 days.

(21) Appl. No.: 10/582,608

(22) PCT Filed: Dec. 11, 2003

(86) PCT No.: PCT/RU03/00550

§ 371 (c)(1), (2), (4) Date: Jun. 12, 2006

(87) PCT Pub. No.: WO2005/056209

PCT Pub. Date: Jun. 23, 2005

(65) Prior Publication Data

US 2007/0098835 A1    May 3, 2007

(51) Int. Cl.
*B28B 3/00* (2006.01)
*B28B 7/30* (2006.01)

(52) U.S. Cl. .................. 425/396; 425/388; 425/403

(58) Field of Classification Search .................. 425/89, 425/369, 394, 396, 403, 411, 388; 72/385
See application file for complete search history.

(56) References Cited

U.S. PATENT DOCUMENTS

| 3,069,721 | A | * | 12/1962 | Arni et al. | 425/403 |
| 4,816,103 | A | * | 3/1989 | Ernest | 156/205 |
| 5,000,673 | A | * | 3/1991 | Bach et al. | 425/396 |
| 5,464,337 | A | * | 11/1995 | Bernardon et al. | 425/112 |

FOREIGN PATENT DOCUMENTS

| RU | 1 814 232 |  | 1/1996 |
| RU | 1706148 | * | 11/1996 |
| RU | 2 118 217 |  | 8/1998 |
| RU | 2 205 084 |  | 5/2003 |

* cited by examiner

*Primary Examiner*—Yogendra Gupta
*Assistant Examiner*—Maria Veronica D Ewald
(74) *Attorney, Agent, or Firm*—Oblon, Spivak, McClelland, Maier & Neustadt, P.C.

(57) ABSTRACT

The device contains the transformable mandrel (12) made of plane elements (14) pivotedly connected in-between with the use of gas-proof fabric (15,16), the means for preliminary and final mandrel transformation including the flexible vacuum chamber and traverse-pusher (11) with the drive (10), and the mechanism for putting the transformable mandrel into its initial plan state made in the form of two parallel slabs (6, 7) with the drive for their reciprocal travel (9). The means for preliminary mandrel transformation is made in the form of the system of pushers placed in rows on the lower and the upper slabs with individual drives. The perforations in the slabs provide the possibility for the pushers to interact with the transformable mandrel placed between the slabs whereas the mandrel with sheet blank article is put into the vacuum chamber.

8 Claims, 2 Drawing Sheets a.

b.

○ the upper pusher
● the lower pusher

DEVICE FOR SHEET MATERIAL CORRUGATION

TECHNICAL FIELD

The invention can be defined in its most general form as a non-cutting shaping of materials, namely a device for sheet material corrugation by means of bending.

BACKGROUND ART

Known is a device for sheet material corrugation including two systems of dies placed on either side of the blank between two parallel slabs of the frame and the drive made in the form of piston installed between the guides providing the piston travel to bedplate for transformation of these systems from initial to final relief state corresponding to that of the ready-made article. In this connection, the systems of dies are made of similar plane elements pivotedly connected in-between along all the sides (Inventors' certificate no. 1,690,903 USSR, Int. Cl.: B 21 D 13/02. Device for sheet material corrugation.—Bulletin no. 42 of 19.07.89).

The main short-coming of herein-presented device is that the drive for the dies systems transformation works if and only if there is a definite starting angle between the elements of the systems in its initial state. At the same time with the aim to exact the shaping the plane blank of the corrugated article must reproduce in its initial state the shape of the tooling; it is possible only at full plane initial state of the dies systems.

Known is a device for sheet material corrugation containing the systems of the upper and the lower dies whereof each system includes the primary shaping system in its initial state and the auxiliary relief system of dies pivotedly connected in-between providing their simultaneous transformation and the transformation drive made in the form of removable vacuum chamber (RU Patent no. 02118217. Device for sheet material corrugation. Int. Cl.: B 21 D 13/00, 27.08.98).

The main short-coming of herein-presented device is that to put the plane shaping systems of dies together with the plane blank into the relief state and to connect them in-between along the bending lines there must be the auxiliary systems of dies similar in structure and production complexity wherefore it complicates and raises the expenses for production of this tooling, narrows the range of transformation of the shaping systems of dies, and cuts down the technological capabilities of the device.

Known is a device for production of intricate profile articles from composite material containing the shaping mandrel including the elements pivotedly connected at locations of deformations and the means for preliminary and final displacement of these elements. The first one is made in the form of hermetic sleeves placed on the fabric layer joining the elements at locations of relief protrusions and connected by the operating environment feeding system while the second one is made in the form of pushing traverse connected to the seesaw travel drive (Inventors' certificate no. 1,706,148 SU A1. Device for production of intricate profile articles from composite material.—Int. Cl.: B 29 C 59/00, B 29 D 9/00//B 29 K 105:08, B 29 L 9:00). The given device is taken as a prototype.

The main short-coming of herein-presented device is cutting down of the shaping tooling technological capabilities due to the impossibility to obtain the zigzag-corrugated sheet with high consistence of crimps because of the shaping tooling structure elements (the sleeves from air-proof fabric) between the elements of the shaping mandrel. Moreover, the sleeves complicate and raise the expenses for production of shaping mandrel, and tensile loads caused by operating environment result in failure of fabric pivots which connect the mandrel elements.

DISCLOSURE OF INVENTION

The invention, as applied to the devices for sheet material corrugation, has for its object to solve the problem of putting the shaping mandrel together with the blank into the relief state so that the geometrical parameters of the crimp provide their further reciprocal transformation by means of compression applying side forces.

The technical result attained at executing of the claimed invention is the broadening of technological capabilities by means of expanding the transformation range of the transformable mandrel and extending of useful operating life.

The stated technical result is attained by that the device contains the transformable mandrel composed of plane elements pivotedly connected in-between with the use of gas-proof fabric, the means for preliminary mandrel transformation including the removable vacuum chamber with the sealing roller and the vacuumization system, the means for final mandrel transformation including the traverse with the drive for its plane-parallel travel, and the mechanism for putting the mandrel into its initial plane state including two parallel slabs situated on either side of the mandrel one over another and the drive for their reciprocal travel. The means for preliminary mandrel transformation is made in the form of two systems of pushers with individual drives for their seesaw travel installed respectively on the lower and the upper slabs. The perforations in the slabs provide the possibility for the pushers to interact with the transformable mandrel from its both sides at locations of mandrel elements pivot connections at the intersections of saw-tooth and zigzag lines of bending. The rows of the lower pushers are placed so that they can come into contact with the mandrel along the protrusions zigzag lines while the rows of the upper pushers—along the recesses zigzag lines. The means for final mandrel transformation contains the second traverse located on the lower slab on the other side of the mandrel parallel to the first one and the drive for its plane-parallel travel. The distance L between the rows of the pushers in the direction of saw-tooth bending lines of the mandrel is equal to $$L=\sqrt{L_r^2-h^2},$$

where $L_r$ is the step of zigzag lines on the corrugated article development;

h is the corrugated article relief height after the preliminary transformation.

The height h is taken minimal so that to provide further reciprocal transformation of the shaping mandrel with the blank by means of force application from the side of traverses.

The undertaken by the applicant state of the art analysis shows that there are no analogs characterized by the combination of the features identical to those of the invention. Therefore, the claimed technical solution satisfies the "novelty" condition of patentability.

The results of retrieval for the known solutions in the given area with the aim to reveal the features identical with distinctions of the claimed technical solution show that its features do not result from the state of the art. From the defined state of the art the applicant managed to reveal no influence of the specified essential features upon the attainment of the stated technical result. The claimed technology, therefore, satisfies the "inventive step" condition of patentability.

BRIEF DESCRIPTION OF DRAWINGS

The FIGS. 1-4 present the essence of the invention.

Figure 1:
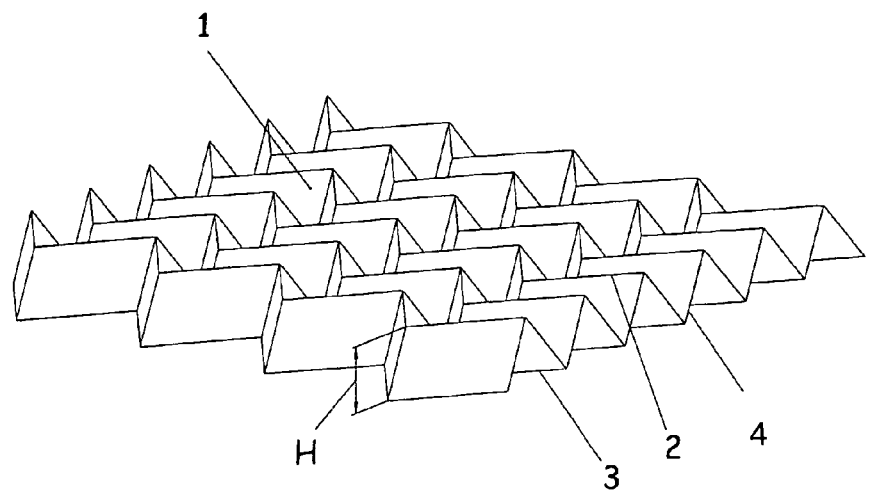
FIG. 1 is a general view of the corrugated article.
Figure 2:
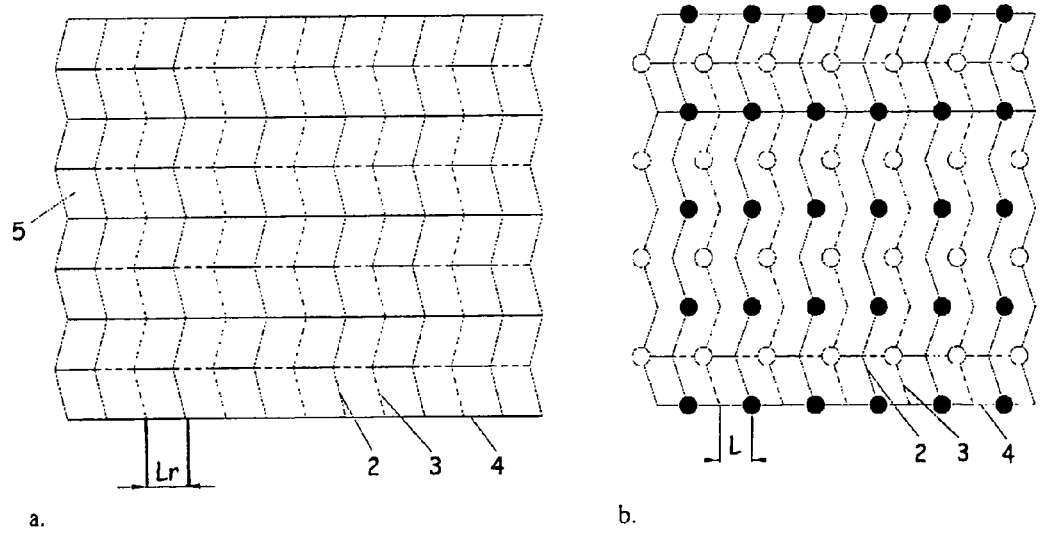
FIG. 2 is the core blank plane sheet: a—in its developed state, b—in its preliminary transformed state (with the pushers lay-out)
Figure 3:
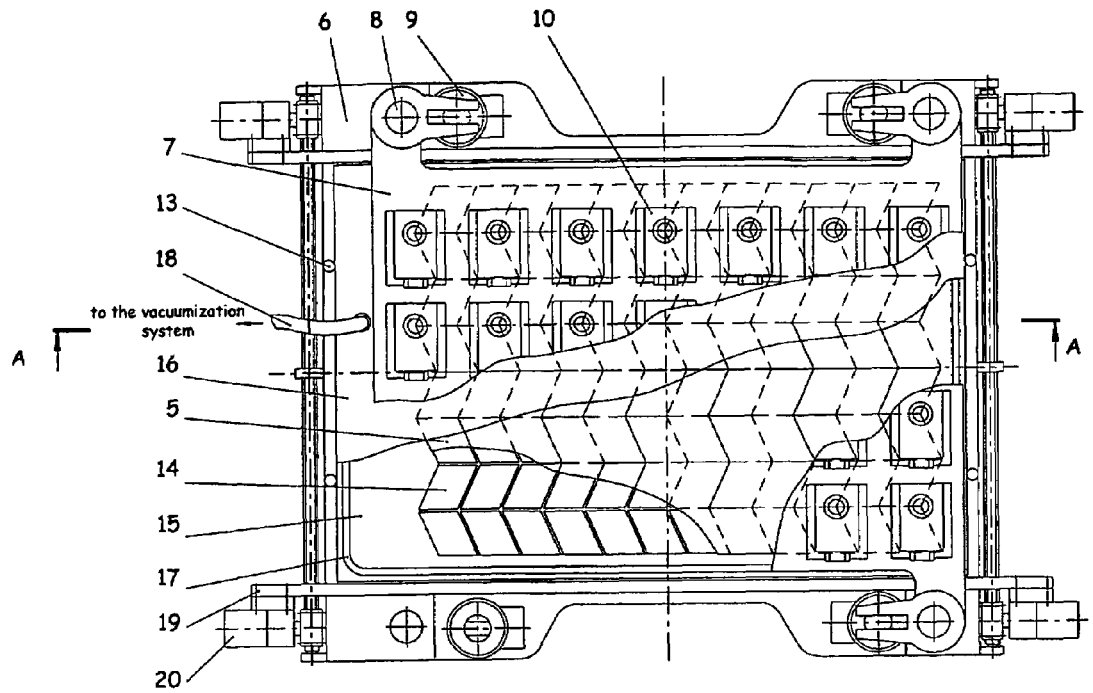
FIG. 3 is a cut-away drawing of the device for corrugation.
Figure 4:
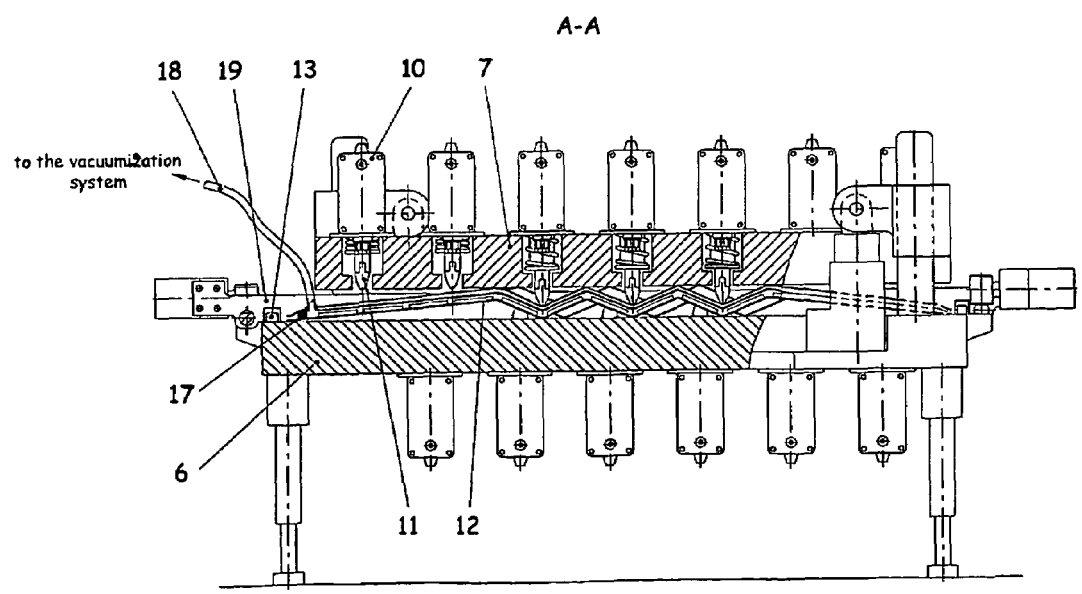
FIG. 4 is a sectional view A-A of FIG. 3.

The FIGS. 1-4 present the following positions:

1 is the ready-made corrugated article; 2 is the protrusions zigzag line; 3 is the recesses zigzag line, 4 is the saw-tooth line; 5 is the core sheet blank; 6 is a table with the lower slab; 7 is the upper slab; 8 is the guiding leg; 9 is the electric screw-jack; 10 is the electromagnet with restoring spring; 11 is the pusher; 12 is the shaping mandrel; 13 are the aligning holders; 14 are the shaping mandrel plane elements; 15 is the shaping mandrel gas-proof sheet; 16 is the upper sheet; 17 is the sealing cord; 18 is the flexible pipe; 19 is the traverse; 20 is the motor-reductor.

BEST MODE FOR CARRYING OUT THE INVENTION

The device contains the lower fixed slab-table 6 and parallel slab 7 which is placed over the slab 6 and upright-movable along the guiding legs 8 with the use of electric screw-jacks 9. Perforated in the slabs 6 and 7 are the through holes wherein the holes in the slab 6 are in a staggered rows with respect to the holes in the slab 7. Installed under the slab-table 6 and on the slab 7 at locations of the perforations are the electromagnets 10 with restoring spring. Fixed on the armature of each electromagnet 10 is the pusher 11 provided with the possibility to influence the placed between the slabs shaping mandrel 12 through the perforations in the slabs 6 and 7. The holders 13 are installed on the surface of the slab 6 in its developed state for proper placement of the shaping mandrel 12. The shaping mandrel 12 represents the system of dies in the form of plane elements 14 pivotedly connected in-between with the use of gas-proof sheet 15. The plane elements 14 are affixed onto the gas-proof sheet 15 with the gaps between the elements 14 sufficient to provide the reciprocal transformation into the relief structure of the mandrel 12 with the sheet blank 5 and another sheet 16 from gas-proof material. The shape of the elements 14 and their dimensions taking into account the gaps width correspond to that of the ready-made corrugated article 1. Centerlines of the pivots coincide with the bending lines on the development of the blank 5 which correspond to zigzag lines of protrusions 2, recesses 3 and saw-tooth lines 4 of the ready-made corrugated article 1. Along the edges the mandrel 12 has the free fields of the sheet 15 whose width is not less than the height of the corrugated article 1 full relief. The sheet 16 is located above the mandrel 12 from the side of its elements 14 and has the same dimensions as the gas-proof sheet 15. Both sheets can be connected along the edges with the use of sealing cord 17 forming in that way the enclosed transformable chamber which can be connected to the vacuumization system line (not shown) with the use of the flexible pipe 18.

The perforations in the slabs 6 and 7 are located so that the pushers 11 can come into contact with the placed between the slabs 6 and 7 shaping mandrel 12 at nodal zones, i.e. at intersections of saw-tooth and zigzag lines of bending. At the same time the rows of the lower and the upper pushers 11 are situated in alternating sequence along the saw-tooth lines 4 with the possibility to come into contact with the mandrel 12 in the process of its preliminary transformation respectively along the protrusions 2 and recesses 3 zigzag lines. The distance L between adjacent intersections of projections of the bending lines of the mandrel on the slab in the direction of saw-tooth bending lines is equal to $$L=\sqrt{L_r^2-h^2},$$

where $L_r$ is the distance between adjacent zigzag lines of bending on the corrugated article development;

h is the corrugated article relief height after the preliminary transformation.

The height h is taken minimal so that to provide further reciprocal transformation of the shaping mandrel 12 with the blank 5 to the required crimp location consistence by means of force application to the side edges of the mandrel 12.

Installed on the slab-table 6 is the mechanism for mandrel 12 final transformation made in the form of two traverses 19 located on either its side in the direction of saw-tooth lines with the possibility of plane-parallel seesaw travel by dint of rack gearing from individual electric drives (motor-reductors 20) rigidly connected with the traverses 19.

In its initial state the slab 7 is raised over the slab-table 6 surface, electromagnets 10 are switched on wherefore the pushers 11 are drowned into the perforations of the slabs 6 and 7.

The shaping mandrel 12 is placed onto the slab 6 between the aligning holders 13 whereupon the sheet blank 5 of the corrugated article 1 and the sheet 16 from gas-proof material are consecutively placed onto the shaping mandrel 12. After that, switching on the electric screw-jacks 9, the slab 7 guided by the legs 8 is drawn down onto the obtained pack providing its compression required to put the mandrel 12 together with the blank 5 into the plane state. Then, the prominent edges of the sheets 15 and 16 are connected with the use of sealing cord 17 whereupon the cavity of the obtained chamber is vacuumized through the flexible pipe 18 inserted between the sheets 15 and 16.

Switching on the electric screw-jacks 9, the slab 7 goes up for distance h, whereupon the electromagnets 10 are consecutively switched off as follows.

Simultaneously switched off are the middle row (oriented in the direction of the zigzag lines) electromagnets of the upper group and two rows of electromagnets (located on either side of the middle row) of the lower group. Later on switched off consecutively in pairs are the electromagnets of neighboring rows of the upper and the lower groups situated on either side from the middle row in the direction towards the circumference.

When switching off the electromagnets 10, their armatures pushed out under the influence of restoring springs influence upon the elements 14 through the pushers 11 at nodal zones of the mandrel 12 transforming it into the relief structure with the crimps height equal to h. The sheet blank 5 being constantly in contact along the full length with the mandrel 12 gets the same shape owing to the rarefication set up in the cavity between the sheets 15 and 16.

After preliminary transformation, switching on the electromagnets 10, the slab 7 goes up for distance equal taking into account the vacuum chamber walls thickness to the height H of ready-made relief article 1. Switching on the motor-reductors 20, the traverses 19 are inserted into the space between the slabs 6 and 7. The electromagnets 10 are switched on at once when the traverses touch having at this very moment the wavy shape lateral edges of the mandrel 12. As a result, the pushers 11 drown down into the perforations in the slabs 6 and 7 not preventing the mandrel 12 from further transformation till the given geometrical parameters of the blank 5 are formed. When the process of transformation is over, the slab 7 goes up, the traverses 19 revert to the initial position whereupon the cavity of the vacuum chamber is depressurized and the ready-made article is removed.

INDUSTRIAL APPLICABILITY

The invention can be used for creation of technological equipment for production of sandwich panels light core used in aircraft construction, building units, and in production of heat-exchange apparatus elements and filters.

The invention claimed is:

1. A device for sheet material corrugation comprising:
a removable vacuum chamber including a transformable mandrel including a plurality of plane elements pivotally connected with each other, a sheet of gas-proof material, and a sealing cord;
means for performing a preliminary mandrel transformation;
means for performing a final mandrel transformation including a first traverse with a first drive providing a plane-parallel travel for the first traverse,
a mechanism for putting the transformable mandrel into an initial plane state, said mechanism including a lower slab and an upper slab parallel to each other and located one over another on both sides of the transformable mandrel and a drive providing their reciprocal travel,
wherein said means for performing said preliminary mandrel transformation include two systems of pusher rows installed correspondingly on the lower and upper slabs, wherein said first traverse and said first drive are installed on the lower slab.

2. A device according to claim 1, wherein pushers of said two systems of pusher rows have individual drives providing seesaw travel of said pushers, wherein perforations in the lower and upper slabs provide consecutive interaction of the pushers with the transformable mandrel on its two sides at locations of plane elements pivot connections at intersections of saw-tooth and zigzag bending lines of the transformation mandrel.

3. A device according to claim 1, wherein rows of pushers on the lower slab are placed so as to come into contact with the transformable mandrel during said preliminary mandrel transformation along protrusions zigzag lines, while the rows of pushers on the upper slab are placed so as to come into contact during said preliminary mandrel transformation with the transformable mandrel along recesses zigzag lines.

4. A device according to claim 1, wherein the means for performing said final mandrel transformation include a second traverse located such that said first and second traverses are located on opposite sides of the lower slab parallel to each other, said means for performing said final mandrel transformation further comprising a second drive providing a plane-parallel travel for the second traverse.

5. A device according to claim 2, wherein the pushers are configured to interact with the transformation mandrel at locations of a pivoted connection of the plane elements of the transformation mandrel at intersections of bending lines of the transformation mandrel upon completion of said preliminary transformation, wherein a distance L between adjacent intersections of projections of bending lines of the transformation mandrel in a direction of saw-tooth bending lines is equal to $$L=\sqrt{L_r^2-h^2},$$

where $L_r$ is a distance between adjacent zigzag lines of bending on said transformation mandrel prior to said preliminary transformation in a direction of saw-tooth bending lines;
h is a corrugated article relief height after the preliminary transformation.

6. A device according to claim 5, wherein the corrugated article relief height h after the preliminary transformation is minimal so as to provide further joint transformation of the transformation mandrel.

7. A device according to claim 1, wherein said removable vacuum chamber includes two gas-proof sheets connected to each other by said sealing cord along edges of said two gas-proof sheets so as to provide a seal between said two gas-proof sheets, and wherein said transformable mandrel is enclosed between said two gas-proof sheets.

8. A device according to claim 1, wherein said removable vacuum chamber is configured to receive an article to be corrugated and maintain a vacuum with said article inside said removable vacuum chamber during said preliminary and final mandrel transformations.

* * * * *